United States Patent
Stenneth

(10) Patent No.: US 9,600,943 B2
(45) Date of Patent: Mar. 21, 2017

(54) RENDERING OF A LOCAL ASSISTANCE REQUEST

(71) Applicant: HERE Global B.V., LB Veldhoven (NL)

(72) Inventor: Leon Oliver Stenneth, Chicago, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 14/811,731

(22) Filed: Jul. 28, 2015

(65) Prior Publication Data
US 2017/0032585 A1  Feb. 2, 2017

(51) Int. Cl.
*B60Q 1/00* (2006.01)
*G07C 5/00* (2006.01)
*G05D 1/02* (2006.01)

(52) U.S. Cl.
CPC ............ *G07C 5/008* (2013.01); *G05D 1/021* (2013.01)

(58) Field of Classification Search
CPC .... G07C 5/008; G05D 1/0242; G05D 1/0255; G05D 1/0011; G05D 1/0297; G06Q 50/28; B60W 50/035; B60Q 1/00
USPC ............................. 701/2, 23; 705/44; 340/439
See application file for complete search history.

(56) References Cited

U.S. PATENT DOCUMENTS

| | | | | |
|---|---|---|---|---|
| 8,532,862 | B2* | 9/2013 | Neff | G05D 1/0231 180/167 |
| 8,996,224 | B1* | 3/2015 | Herbach | G05D 1/0011 180/116 |
| 2011/0125344 | A1* | 5/2011 | An | G05D 1/0242 701/2 |
| 2011/0241862 | A1* | 10/2011 | Debouk | B60W 50/035 340/439 |
| 2014/0136414 | A1* | 5/2014 | Abhyanker | G06Q 50/28 705/44 |
| 2014/0306799 | A1* | 10/2014 | Ricci | B60Q 1/00 340/5.83 |
| 2015/0006005 | A1* | 1/2015 | Yu | G05D 1/0297 701/22 |

OTHER PUBLICATIONS

K, Kevin, "ELI5: How Do Google Cars (and toher self-driving vehicles) Deal with Anomalies (For Example, A Human Direction Traffic)?" https://www.reddit.com/r/explainlikeimfive/comments/35lell/eli5_how_do_google_cars_and_other_selfdriving/, obtained from the internet Jul. 28, 2015.
Muller, Joann, "Baby Steps Toward Driverless Cars Deliver Huge Leaps in Safety", http://www.forbes.com/sites/joannmuller/2014/09/11/baby-steps-toward-driverless-cars-deliver-huge-leaps-in-safety/, Publication Date: Sep. 11, 2014.

* cited by examiner

*Primary Examiner* — Yuri Kan
(74) *Attorney, Agent, or Firm* — Lempia Summerfield Katz LLC

(57) ABSTRACT

A method comprising receiving map data that is associated with a location of an autonomous vehicle, determining an operational state of the autonomous vehicle, determining that the map data and the operational state satisfy a local assistance request criteria, and causing rendering of a local assistance request based, at least in part, on the determination that the map data and the operational state satisfy the local assistance request criteria is disclosed.

22 Claims, 10 Drawing Sheets

RENDERING OF A LOCAL ASSISTANCE REQUEST

TECHNICAL FIELD

The present application relates generally to rendering of a local assistance request.

BACKGROUND

Autonomous vehicles are increasingly being utilized to transport passengers and goods, survey geographical features and roads, and/or the like. In many circumstances, autonomous vehicles may interact with other vehicles, people, apparatuses, and/or the like. As such, it may be desirable to allow an autonomous vehicle to interact with other vehicles, people, apparatuses, and/or the like in a safe and efficient manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving map data that is associated with a location of an autonomous vehicle, determining an operational state of the autonomous vehicle, determining that the map data and the operational state satisfy a local assistance request criteria, and causing rendering of a local assistance request based, at least in part, on the determination that the map data and the operational state satisfy the local assistance request criteria.

One or more example embodiments may provide an apparatus, a computer readable medium, a computer program product, and/or a non-transitory computer readable medium having means for receiving map data that is associated with a location of an autonomous vehicle, means for determining an operational state of the autonomous vehicle, means for determining that the map data and the operational state satisfy a local assistance request criteria, and means for causing rendering of a local assistance request based, at least in part, on the determination that the map data and the operational state satisfy the local assistance request criteria.

In at least one example embodiment, the mobility impaired state indicates circumstances where the autonomous vehicle is incapable of moving itself.

In at least one example embodiment, the mobility impaired state indicates circumstances where it is undesirable for the autonomous vehicle to move itself.

In at least one example embodiment, determination of the operational state comprises receipt of sensor information from at least one sensor, and determination that the sensor information is indicative of the operational state.

In at least one example embodiment, determination of the operational state comprises receipt of sensor information from at least one sensor, and determination that the map data and the sensor information is indicative of the operational state.

In at least one example embodiment, the determination that the map data and the sensor information is indicative of the operational state comprises, determination that the sensor information is indicative of the operational state, determination that the operational state is undesirable, determination of an autonomous remedial action for the operational state; and determination based, at least in part, on the map data, that the autonomous remedial action is beyond a safety threshold.

In at least one example embodiment, the map data comprises dynamic map data and the determination that the autonomous remedial action is beyond the safety threshold comprises determination that the autonomous remedial action is beyond the safety threshold, based at least in part on the dynamic map information.

In at least one example embodiment, the map data comprises static map data and the determination that the autonomous remedial action is beyond the safety threshold comprises determination that the autonomous remedial action is beyond the safety threshold, based at least in part on the static map data.

In at least one example embodiment, the determination that the autonomous vehicle is in a mobility impaired state is based, at least in part, on the location of the autonomous vehicle.

In at least one example embodiment, the determination that that the autonomous vehicle is located at the dangerous location is based, at least in part, on the location of the autonomous vehicle.

In at least one example embodiment, the map data that is associated with the location of the autonomous vehicle refers to map data that has a data association with the location of the autonomous vehicle.

In at least one example embodiment, determine the location of the autonomous vehicle.

In at least one example embodiment, determination that the autonomous vehicle is located at the dangerous location comprises determination that the map data indicates that an immobile autonomous vehicle at the location of the autonomous vehicle is beyond a safety threshold.

In at least one example embodiment, the map data comprises dynamic map data, and the determination that the map data indicates that an immobile autonomous vehicle at the location of the autonomous vehicle is beyond the safety threshold comprises determination that the dynamic map data indicates that an immobile autonomous vehicle at the location of the autonomous vehicle is beyond the safety threshold.

In at least one example embodiment, the map data comprises static map data, and the determination that the map data indicates that an immobile autonomous vehicle at the location of the autonomous vehicle is beyond the safety threshold comprises determination that the static map data indicates that an immobile autonomous vehicle at the location of the autonomous vehicle is beyond the safety threshold.

In at least one example embodiment, the map data comprises dynamic map data, and the determination that the autonomous vehicle is located at the dangerous location is based, at least in part, on the dynamic map data.

In at least one example embodiment, the map data comprises static map data, and the determination that the autonomous vehicle is located at the dangerous location is based, at least in part, on the static map data.

In at least one example embodiment, the dangerous location refers to a location where it is undesirable for an autonomous vehicle to be immobile.

In at least one example embodiment, the local assistance request is a distance-limited signal that solicits assistance with movement of the autonomous vehicle.

In at least one example embodiment, the distance-limited signal comprises at least one of a visual signal, an audible signal, or a low-power radio frequency signal.

In at least one example embodiment, the local assistance request includes information indicative of at least one of the autonomous vehicle location, the operational state, or at least part of the map data.

One or more example embodiments further determine that the location of the autonomous vehicle has changed to a different location, receive map data that is associated with the different location of the autonomous vehicle, determine that the map data and the operational state fail to satisfy a local assistance request criteria, and preclude rendering of the local assistance request based, at least in part, on the determination that that the map data and the operational state fail to satisfy the local assistance request criteria.

One or more example embodiments further determine that the location of the autonomous vehicle has changed to a different location, receive map data that is associated with the different location of the autonomous vehicle, determine based, at least in part, on the map data and the determination that the autonomous vehicle is in the mobility impaired state, that the autonomous vehicle fails to be located in a dangerous location, and preclude rendering of the local assistance request based, at least in part, on the determination that the autonomous vehicle fails to be located in the dangerous location and the determination that the autonomous vehicle is in the mobility impaired state.

One or more example embodiments further determine that the location of the autonomous vehicle has changed to a different location, receive map data that is associated with the different location of the autonomous vehicle, determine that the autonomous vehicle is in the mobility impaired state, determine based, at least in part, on the map data and the determination that the autonomous vehicle is in the mobility impaired state, that the autonomous vehicle fails to be located in a dangerous location, and terminate rendering of the local assistance request based, at least in part, on the determination that the autonomous vehicle fails to be located in the dangerous location and the determination that the autonomous vehicle is in the mobility impaired state.

One or more example embodiments further transmit a non-local assistance request based, at least in part, on the determination that the map data and the operational state satisfy the local assistance request criteria, the non-local assistance request being solicitation for assistance by a non-local responder.

In at least one example embodiment, the non-local assistance request is a non-distance-limited signal.

In at least one example embodiment, the non-distance-limited signal comprises a non-low-power radio frequency signal.

One or more example embodiments further determine a duration until arrival of the non-local responder, and determine that the duration is beyond a duration threshold.

In at least one example embodiment, the causation of rendering of the local assistance request is based, at least in part, on the determination that the duration is beyond the duration threshold.

One or more example embodiments further determine that the duration until arrival has changed to a different duration, determine that the different duration is within the duration threshold, and cause termination of the local assistance request based, at least in part, on the determination that the different duration is within the duration threshold.

One or more example embodiments further determine that local assistance has been performed by a local responder, and cause compensation to be distributed to at least one party associated with the local responder.

One or more example embodiments further determine that local assistance has arrived, and in response to the determination that local assistance has arrived, cause the autonomous vehicle to enter a state that allows for movement of the autonomous vehicle by way of an external force.

In at least one example embodiment, entering the state that allows for movement of the autonomous vehicle by way of an external force comprises at least one of disengagement of a drivetrain of the autonomous vehicle, powering down of the autonomous vehicle, or disengagement of a braking device of the autonomous vehicle.

In at least one example embodiment, determination that the map data and the operational state satisfy the local assistance request criteria comprises determination of a safety level based, at least in part, on the map data, and determination that the safety level is beyond a safety threshold.

In at least one example embodiment, determination that the map data and the operational state satisfy the local assistance request criteria comprises determination of a safety level based, at least in part, on the map data and the operational state, and determination that the safety level is beyond a safety threshold.

In at least one example embodiment, the local assistance request criteria comprises a predetermined location attribute and a predetermined operational state.

In at least one example embodiment, determining that the map data and the operational state satisfy the local assistance request criteria comprises determination that the predetermined location attribute corresponds with an attribute of the autonomous vehicle location.

In at least one example embodiment, the map data includes at least one of road segment data, point of interest data, node data, traffic information, or weather information.

In at least one example embodiment, receiving the map data comprises retrieving the map data from memory.

In at least one example embodiment, receiving the map data comprises retrieving the map data from a separate apparatus.

BRIEF DESCRIPTION OF THE DRAWINGS

For a more complete understanding of one or more example embodiments, reference is now made to the following descriptions taken in connection with the accompanying drawings in which.

DETAILED DESCRIPTION OF THE DRAWINGS

Figure 1:
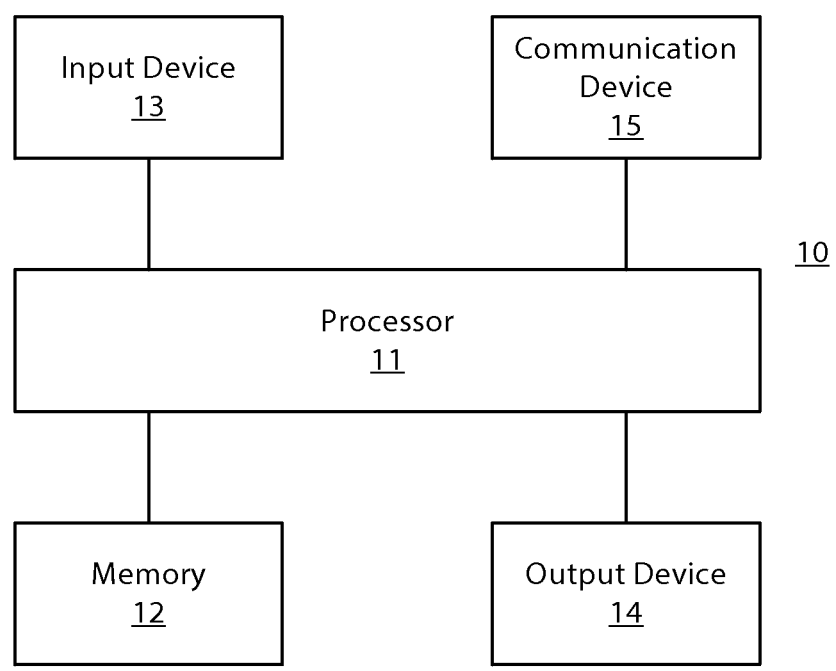
FIG. 1 is a block diagram showing an apparatus according to at least one example embodiment.

Various example embodiments and some of their potential advantages are understood by referring to FIGS. 1 through 10 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a laptop computer, a tablet computer, a media player, a mobile phone, a global positioning system (GPS) apparatus, an automobile, a watercraft, an aircraft, an agricultural implement, and autonomous vehicle, a kiosk, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2:
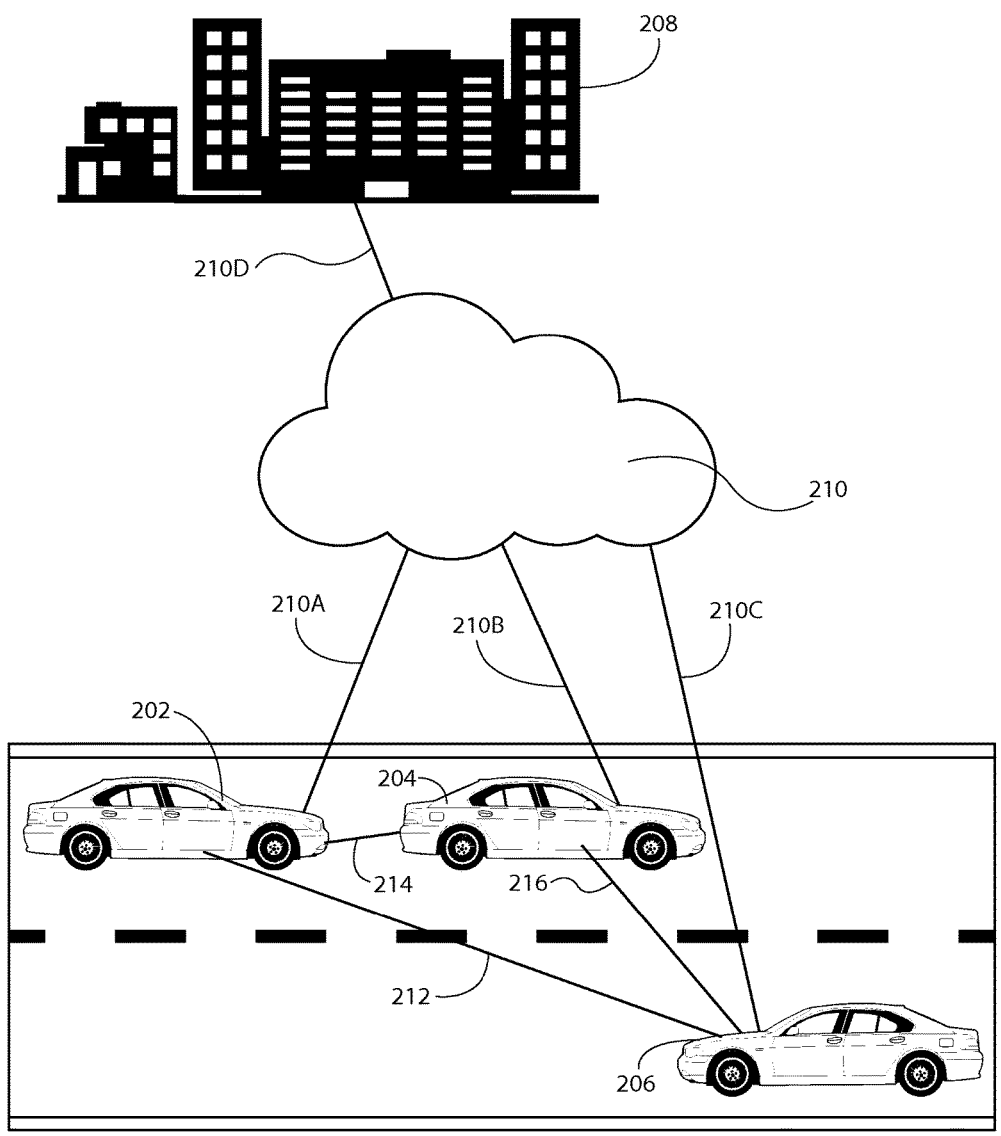
FIG. 2 is a diagram illustrating apparatus communication according to at least one example embodiment.

FIG. 2 is a diagram illustrating apparatus communication according to at least one example embodiment. The example of FIG. 2 is merely an example and does not limit the scope of the claims. For example, apparatus count may vary, apparatus configuration may vary, communication channels may vary, and/or the like.

In modern times, vehicles may utilize one or more sensors to navigate autonomously. For example, an automobile, an aircraft, a watercraft, an agricultural implement, and/or the like may utilize a satellite navigation system such as a Global Positioning System (GPS) receiver, a GLONASS receiver, a Galileo receiver, and/or the like to determine the vehicle's location on the Earth and navigate to a different location without real time control input from an operator of the vehicle. In at least one example embodiment, an apparatus determines a location of an autonomous vehicle. In some circumstances, a vehicle may utilize a radar sensor, a camera module, an ultrasonic sensor, and/or the like to sense and automatically avoid objects such as other vehicles, impassable objects, pedestrians, and/or the like. In at least one example embodiment, an apparatus receives sensor information from at least one sensor. Sensor information may refer to raw data, formatted data, processed data, and/or the like received from a sensor. For example, a GPS receiver may transmit data packets to an apparatus having a particular format, a radar sensor may transmit analog voltages to the apparatus, and/or the like.

A vehicle that may navigate in manners such as previously described and other similar manners without real time control input from an operator may be referred to as an autonomous vehicle. For example, an automobile that automatically navigates by way of a GPS receiver may be an autonomous vehicle. In some circumstances, an autonomous vehicle may receive non-real time control input to control the navigation of the vehicle. For example, an operator of the autonomous vehicle may communicate a navigational path for the apparatus to follow before a trip of the autonomous vehicle is initiated, and may update the navigational path while the autonomous vehicle is navigating. In other examples, the autonomous vehicle may receive real-time control inputs for at least a portion of the operation of the autonomous vehicle. For example, an autonomous aircraft may be controlled by a human pilot during takeoffs and landings, and controlled by an electronic automatic pilot during cruising. In some circumstances, an autonomous vehicle may operate absent any people onboard. For example, an autonomous vehicle may operate absent an onboard operator, passengers, and/or the like. For instance, an autonomous vehicle configured to carry cargo, perform geographical surveys, and/or the like, may be controlled by a remote operator and lack any people on board. An autonomous vehicle absent any people on board may be referred to as a passengerless autonomous vehicle, operating in a passengerless state, and/or the like.

One or more example embodiments may include a geographic database. For example, the geographic database may comprise, navigational data, location attributes, and/or the like. Information included within a geographic database may be referred to as map data. For example, the geographic database may include node data records, road segment or link data records, point of interest (POI) data records, perspective image data records, video content data records, and other data records. In at least one example embodiment, map data includes at least one of road segment data, POI data, node data, traffic information, or weather information. More, fewer or different data records may be provided. In at least one example embodiment, the other data records include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or GPS data associations (such as using known or future map matching or geo-coding techniques), for example.

In at least one example embodiment, the road segment data records are links or segments representing roads, streets, or paths, as may be used in the calculated route or recorded route information for determination of one or more personalized routes. The node data records may be end points corresponding to the respective links or segments of the road segment data records. The road link data records and the node data records may represent a road network, such as used by vehicles, cars, and/or other entities. Alternatively, the geographic database may contain path segment and node data records or other data that represent pedestrian paths or areas in addition to or instead of the vehicle road record data, for example.

The road/link segments and nodes, as well as other geographic locations may be associated with attributes, such as geographic coordinates, road surface conditions, traffic conditions, adjacent geographic features, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the geographic database may include and/or be associated with event data (e.g., traffic incidents, constructions, scheduled events, unscheduled events, etc.) associated with the POI data records or other records of the geographic database.

The geographic database may be maintained by a content provider (e.g., a map developer) in association with a services platform. By way of example, the map developer may collect geographic data to generate and enhance the geographic database. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used.

The geographic database may be a master geographic database stored in a format that facilitates updating, maintenance, and development. For example, the master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation apparatuses or systems.

Geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation apparatus, such as by an end user apparatus, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation apparatus developer or other end user apparatus developer, may perform compilation on a received geographic database in a delivery format to produce one or more compiled navigation databases.

In some circumstances, the geographic data compiled within a database may be static data. For example, the geographic data may be values that rarely or never change, such as the latitude and longitude of an address, the relative positions of roads, and/or the like. Such data may be referred to as static map data. In some circumstances, the geographic data compiled within a database may be dynamic data. For example, the geographic data may be values that change frequently over time, such as traffic conditions, weather conditions, and/or the like. Such data may be referred to as dynamic map data.

As mentioned above, a server side geographic database may be a master geographic database, but in alternate embodiments, a client side geographic database may represent a compiled navigation database that may be used in or with an end user apparatus to provide navigation and/or map-related functions. For example, the geographic database may be used with an end user apparatus to provide an end user with navigation features. In such an example, the geographic database may be downloaded or stored on the end user apparatus, such as in one or more applications, or the end user apparatus may access the geographic database through a wireless or wired connection (such as via a server and/or a communication network), for example.

In at least one example embodiment, the end user apparatus is one of an in-vehicle navigation system, a personal navigation device (PND)/personal navigation apparatus, a portable navigation device/portable navigation apparatus, a cellular telephone, a mobile phone, a personal digital assistant (PDA), a watch, a camera, a computer, and/or other apparatuses that may perform navigation-related functions, such as digital routing and map display. In at least one example embodiment, the navigation apparatus is a cellular telephone. An end user may use the end user apparatus for navigation and map functions such as guidance and map display, for example, and for determination of one or more personalized routes or route segments based, at least in part, on one or more calculated and recorded routes, according to exemplary embodiments. In at least one example embodiment, an apparatus receives map data that is associated with a location of an autonomous vehicle. Map data that is associated with the location of the autonomous vehicle may refer to map data that has a data association with the location of the autonomous vehicle. For example, a navigational apparatus mounted within the autonomous vehicle may receive GPS signals corresponding with latitude and longitude coordinates, and the navigational apparatus may receive map data associated with the coordinates from a geographical database. In some circumstances, map data may be stored in memory. For example, a navigational apparatus may comprise non-volatile memory, a hard disk drive, and/or the like to store a geographical database. In at least one example embodiment, map data comprises retrieving the map data from memory. In some circumstances, map data may be stored on a separate apparatus. For example, the map data may be stored on a server hosted by a service provider, stored in the memory of a separate apparatus such as an automobile, and/or the like. In at least one example embodiment, receiving the map data comprises retrieving the map data from a separate apparatus.

To facilitate autonomous operation of a vehicle, it may be desirable for an apparatus to communicate with another apparatus. For example, it may be desirable for an autonomous vehicle to receive map data from a service provider, for an autonomous vehicle to receive location information associated with other vehicles, and/or the like. In this manner, an autonomous vehicle may navigate in a safe and accurate manner, may avoid colliding with other objects and vehicles, and/or the like.

The example of FIG. 2 illustrates communication between apparatuses 202, 204, 206, and 208 by way of communication channels 210, 212, 214, and 216. Even though the example of FIG. 2 illustrates apparatuses 202, 204, and 206 as automobiles and apparatus 208 as a building, it should be understood that the communication in the example of FIG. 2 may be between apparatuses associated with, and/or included by, apparatuses 202, 204, 206 and 208. For example, the communication may be between electronic apparatuses housed within any of apparatuses 202, 204, 206, and 208. An electronic apparatus may be an electronic apparatus that a user commonly utilizes during performance of various tasks, activities, and/or the like. For example, apparatus 202 may house an electronic apparatus that an operator of apparatus 202 frequently utilizes to view information, to browse websites, to search for map information, and/or the like. For example, the electronic apparatus may be a phone, a tablet, a computer, a laptop, a navigation system, and/or the like. In another example, apparatus 208 may house a separate electronic apparatus. The separate electronic apparatus may be utilized to store information associated with the electronic apparatus, to process information received from the electronic apparatus, and/or the like. For example, a separate electronic apparatus may be a phone, a tablet, a computer, a laptop, a server, a database, a cloud platform, and/or the like. Although the aforementioned example describes an electronic apparatus and a separate electronic apparatus in some circumstances, the apparatuses may both be electronic apparatuses, both be separate electronic apparatuses, and/or the like.

In the example of FIG. 2, apparatus 202 communicates with apparatus 204 by way of communication channel 210. For example, apparatus 202 may send information to apparatus 204 by way of communication channel 210, apparatus 202 may receive information sent from apparatus 204 by way of communication channel 210, and/or the like. A communication channel, for example, may be a channel utilized for sending and/or receiving of information, data, communications, and/or the like, between two or more apparatuses. It should be understood that communication channel 210 of the example of FIG. 2 illustrates an indirect communication channel between apparatus 202 and apparatus 204. For example, there may be intermediate apparatuses that facilitate communication between apparatus 202 and apparatus 204. For example, there may be one or more routers, hubs, switches, gateways, servers, and/or the like, that are utilized to implement communication channel 210. For example, it can be seen that an intermediate communication channel 210A is present between apparatus 202 and communication channel 210, and an intermediate communication channel 210B is present between apparatus 204 and communication channel 210. In this manner, apparatus 202 may communicate with apparatus 204 by way of communication channels 210A, 210, and 210B. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like. In another example, communication channel 210 may include one or more apparatuses that facilitate communication between communication channel 210A and communication channel 210B, such as a router, a hub, a switch, a gateway, a server, and/or the like.

In the example of FIG. 2, apparatus 202 further communicates with apparatuses 206 and 208 by way of communication channel 210 in a similar manner as described regarding communication between apparatus 202 and apparatus 204. For example, it can be seen that an intermediate communication channel 210C is present between apparatus 206 and communication channel 210, and an intermediate communication channel 210D is present between apparatus 208 and communication channel 210. In a similar manner, in the example of FIG. 2, apparatus 204 may communicate with apparatus 202, 206, and 208, apparatus 206 may communicate with apparatus 202, 204, and 208, and apparatus 208 may communicate with apparatus 202, 204, and 206, and/or the like, by way of communication channels 210, 210A, 210B, 210C, 210D, and/or the like.

In at least one example embodiment, an apparatus and a separate apparatus communicate by way of non-proximity-based communication channels. For example, as depicted in FIG. 2, apparatus 202 communicates with apparatus 204 by way of communication channel 210. In the example of FIG. 2, communication channel 210 may be a local area network communication channel, a wide area network communication channel, an internet communication channel, a cellular communication channel, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of visual display, audio playback, low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a navigation system, an automobile, a watercraft, an aircraft, an agricultural implement, an autonomous vehicle, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In the example of FIG. 2, apparatus 202 communicates with apparatus 204 by way of communication channel 214. For example, apparatus 202 may send information to apparatus 204 by way of communication channel 214, apparatus 202 may receive information sent from apparatus 204 by way of communication channel 214, and/or the like. It should be understood that communication channel 214 of the example of FIG. 2 illustrates a direct communication channel between apparatus 202 and apparatus 204. For example, communication channel 214 may lack intermediate apparatuses that facilitate communication between apparatus 202 and apparatus 204. For example, communication channel 214 may be a proximity-based communication channel. In at least one example embodiment, communication that is based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, a vehicular ad hoc network similar as described in the Institute of Electrical and Electronics Engineers (IEEE) 802.11 and 802.16 standards, and/or the like. In such an example, the exchange of information may be by way of the short range wireless communication, visual communication, audio communication, and/or the like between the apparatus and a separate apparatus, host apparatus, and/or the like.

In the example of FIG. 2, apparatus 204 communicates with apparatus 206 by way of communication channel 216 in a similar manner as described regarding communication between apparatus 202 and apparatus 204 over communication channel 214. For example, it can be seen that communication channel 216 is a direct communication channel. In the example of FIG. 2, apparatus 206 communicates with apparatus 202 by way of communication channel 212 in a similar manner as described regarding communication between apparatus 202 and apparatus 204 over communication channel 214. For example, it can be seen that communication channel 212 is a direct communication channel. Even though it is not shown in the example of FIG. 2, it should be understood than apparatuses 202, 204, and 206 may communicate with apparatus 208 by way of a direct communication channel in some circumstances. For example, apparatus 202 may communication with apparatus 208 over a direct communication channels when apparatus 202 is proximate to apparatus 208.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, a visual communication channel, an audible communication channel, and/or the like. For example, as depicted in FIG. 2, apparatus 202 communicates with apparatus 204 by way of a communication channel 214. In the example of FIG. 2, communication channel 214 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, a visual communication channel, an audible communication channel, and/or the like.

In some circumstances, an autonomous vehicle may have an operational state. For example, the autonomous vehicle may be "parked," "traveling," "passengerless," "disabled," "avoiding an object," and/or the like. In some circumstances, it may be desirable to determine the operational state of an autonomous vehicle. For example, if the autonomous vehicle is traveling to a particular destination, an operator of the autonomous vehicle may prepare for the arrival. For example, the operator may have cargo waiting at the destination, may update a schedule, and/or the like. In another example, if the autonomous vehicle is disabled, the operator may investigate the cause of the disablement, dispatch maintenance personnel to the location of the autonomous vehicle, and/or the like. In at least one example embodiment, an apparatus determines an operational state of an autonomous vehicle. For example, an onboard diagnostics system, a computer, a navigational system, and/or the like within the autonomous vehicle may determine the operational state, and may transmit information indicative of the operational state to another apparatus.

In some circumstances, a particular operational state of an autonomous vehicle may be undesirable. For example, the operational state may be a mobility impaired state. A mobility impaired state may indicate circumstances in which the autonomous vehicle is incapable of moving itself, in which it is undesirable for the autonomous vehicle to move itself, and/or the like. For example, an autonomous vehicle may be incapable of moving itself after a failure of one or more mechanical or electrical components, damage to a tire, depletion of an energy source, and/or the like. In another example, it may be undesirable for an autonomous vehicle to move itself in circumstances in which moving the autonomous vehicle may cause damage to the autonomous vehicle, to another vehicle, to private property, etc., in circumstances in which the autonomous vehicle has incomplete routing information, and/or the like. For example, an autonomous vehicle with incomplete routing information may be unable to navigate around an obstruction without receiving assistance. For example, the autonomous vehicle may require manual control, updated routing instructions, and/or the like to navigate around the obstruction, over the obstruction, etc.

Figure 3:
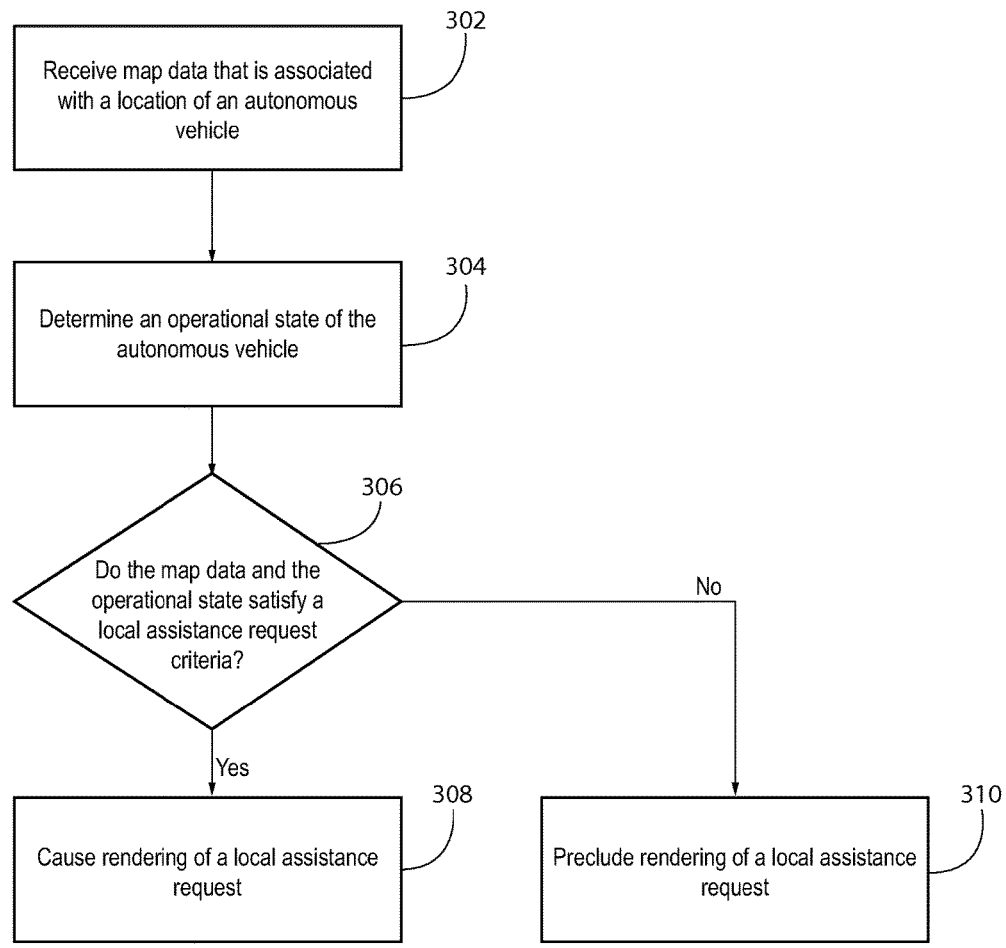
FIG. 3 is a flow diagram illustrating activities associated with determination of satisfaction of a local assistance request criteria according to at least one example embodiment.

FIG. 3 is a flow diagram illustrating activities associated with determination of satisfaction of a local assistance request criteria according to at least one example embodiment. In at least one example embodiment, there is a set of operations that corresponds with the activities of FIG. 3. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 3.

As previously described, an apparatus may determine an operational state of an autonomous vehicle. In some circumstances, it may be desirable to cause rendering of a local assistance request based on the operational state. For example, if the operational state is a mobility impaired state, it may be beneficial for the autonomous vehicle to receive local assistance. For example, if the autonomous vehicle has depleted its energy source, a responder to the local assistance request may provide energy to the autonomous vehicle. For instance, another autonomous vehicle may transfer electrical power, fuel, and/or the like to the autonomous vehicle. In another example, an autonomous vehicle may lose traction on a slippery surface (e.g. a muddy dirt road). In such an example, a pedestrian may push the autonomous vehicle to a surface with better traction properties (e.g. an asphalt road). In another example, the autonomous vehicle may be a convertible, and the retractable top of the autonomous vehicle may be stuck. In such an example, it may be desirable to solicit local assistance for closing the retractable top.

A local assistance request may refer to a distance-limited signal that solicits assistance with movement of the autonomous vehicle. For example, a local assistance request may be a communication on a direct communication channel similar as described regarding FIG. 2. For instance, the distance-limited signal may comprises a visual signal, an audible signal, a low-power radio frequency signal, and/or the like. For example, the apparatus may cause display of a message requesting assistance on an externally mounted display comprised by the autonomous vehicle, cause flashing of lighting comprised by the autonomous vehicle in a particular pattern, cause rendering of an audible message requesting assistance, cause rendering of particular audible pitches and/or patterns by the autonomous vehicle, transmit low power radio transmissions to nearby apparatuses, and/or the like. In this manner, the local assistance request may be received by potential responders. For example, another autonomous vehicle, a pedestrian, an emergency services vehicle, and/or the like may perceive the local assistance request when they are within range of the local assistance request.

In some circumstances, it may be desirable for a local assistance request to include particular information. For example, it may be desirable for the local assistance request to include information indicative of the autonomous vehicle location, the operational state, map data, and/or the like. In this manner, a responder may determine if they can offer an appropriate type of assistance. For example, if the local assistance request indicates the autonomous vehicle is out of fuel, responders who are unable to provide fuel may ignore the local assistance request. In another example, if a tow truck is nearby, a local assistance request indicating the locations of the autonomous vehicle may assist an operator of the tow truck in locating the autonomous vehicle. In yet another example, map data transmitted with the local assistance request may indicate that the location is muddy. In circumstances such as these, a responder may ignore the local assistance request if the mud would impair their ability to assist the autonomous vehicle (e.g. the responder is a vehicle with poor traction in muddy conditions). In at least one example embodiment, a local assistance request includes information indicative of at least one of the autonomous vehicle location, the operational state, or at least part of map data.

In some circumstances, it may be desirable to only render a local assistance request if a local assistance request criteria is met. For example, the autonomous vehicle may be able to receive and/or wait for non-local assistance. Non-local assistance may refer to assistance from a non-local responder. For example, a non-local responder may be a dispatch center for emergency services, a remote control center for the autonomous vehicle, a responder beyond the range of a local assistance request, and/or the like. For instance, if the operational state is not a mobility impaired state, sufficient assistance may be provided by transmitting instructions to the autonomous vehicle, allowing manual control of the autonomous vehicle, and/or the like. In another example, if the operational state is not a passengerless operations state (e.g. the autonomous vehicle is carrying at least one board operator, a passenger, and/or the like), the passenger, operator, and/or the like carried by the autonomous vehicle may provide sufficient assistance. For example, an on-board operator may temporarily manually control the autonomous vehicle, a passenger may give the autonomous vehicle a push until traction is gained, and/or the like. In circumstances such as these, rendering of a local assistance request may be distracting to other vehicles, cause unnecessary response from responders, and/or the like. In at least on example embodiment, an apparatus causes rendering of a local assistance request based, at least in part on a determination that a local request criteria has been satisfied. For example, map data, the operational state, and/or the like may satisfy a local assistance request criteria. For instance, the local assistance criteria may comprise a predetermined location attribute, such as heavy traffic, poor traction, and/or the like, as well as a predetermined operational state, such as a mobility impaired state, a passengerless state, and/or the like. For example, if the autonomous vehicle is in a mobility impaired state, and map data indicates the autonomous vehicle is in a particular location (e.g. broken down on a busy highway), the local assistance criteria may be satisfied. In another example, if the autonomous vehicle is in a passengerless state, the local assistance criteria may be satisfied.

In at least one example embodiment, the local assistance request criteria comprises a predetermined location attribute and a predetermined operational state. In at least one example embodiment, determining that the map data and the operational state satisfy the local assistance request criteria comprises determination that the predetermined location attribute corresponds with an attribute of the autonomous vehicle location. For example, the apparatus may compare map data associated with the autonomous vehicle location to the predetermined location attribute, consult a lookup table, query a database, and/or the like to perform the determination.

In some circumstances, it may be desirable to determine a safety level of an autonomous vehicle. For example, a safety level of an autonomous vehicle may be used to determine that an operational state satisfies a local assistance criteria. In this manner, rendering of a local assistance request may be limited to circumstances where the operational state is beyond the safety level. A safety level may be determined based, at least in part on map data, an operational state, sensor information, map data, and/or the like. For example, an autonomous vehicle that is out of fuel in a parking lot may have a safety level within a safety threshold. For instance, even though the vehicle is out of fuel, it may generally pose no danger to other traffic while parked in a parking lot. In this example, an apparatus may preclude rendering of a local assistance request. In another example, an autonomous vehicle that is disabled in traffic may have a safety level beyond a safety threshold. For instance, a vehicle disabled in traffic may be at risk of being hit by other vehicles. In this example, an apparatus may cause rendering of a local assistance request. In at least one example embodiment, determining that map data and an operation state satisfy a local assistance request comprises determining a safety level, and determining that the safety level is beyond a safety threshold.

In some circumstances, when a responder has arrived at the location of an autonomous vehicle to render assistance, it may be desirable for the autonomous vehicle to transition to a particular operational state. In circumstances such as these, it may be desirable for an apparatus to determine that local assistance has arrived. For example, if the autonomous vehicle needs to be towed by a tow truck, it may be desirable for the autonomous vehicle to release a braking system, power down electrical systems, disengage one or more mechanical couplings, and/or the like. In this manner, the autonomous vehicle may be moved by way of an external force (e.g. the vehicle may be towed, pushed, etc.). In at least one example embodiment, an apparatus determines that local assistance has arrived. For example, a local responder may enter an input into the apparatus, a sensor on the apparatus may detect the local responder, and/or the like. In at least on example embodiment, the determination that local assistance has arrived causes the autonomous vehicle to enter a state that allows for movement of the autonomous vehicle by way of an external force. For example, the autonomous vehicle may enter a state that allows for movement of the autonomous vehicle by way of an external force that comprises disengagement of a drivetrain of the autonomous vehicle, powering down of the autonomous vehicle, disengagement of a braking device of the autonomous vehicle, and/or the like.

At block 302, the apparatus receives map data that is associated with a location of an autonomous vehicle. The receipt, the map data, the association, the location, and the autonomous vehicle may be similar as described regarding FIG. 1 and FIG. 2

At block 304, the apparatus determines an operational state of the autonomous vehicle. The determination and the operational state may be similar as described regarding FIG. 2.

At block 306, the apparatus determines whether the map data and the operational state satisfy a local assistance request criteria. If the apparatus determines that the map data and the operational state satisfy a local assistance request criteria, flow proceeds to block 308. If the apparatus determines that the map data and the operational state fail to satisfy a local assistance request criteria, flow proceeds to block 310.

At block 308, the apparatus causes rendering of a local assistance request. In at least one example embodiment, the causation of rendering of the local assistance request based, at least in part, on the determination that the map data and the operational state satisfy the local assistance request criteria.

At block 310, the apparatus precludes rendering of a of a local assistance request. In at least one example embodiment, the preclusion of rendering of a of the local assistance request is based, at least in part, on the determination that the map data and the operational state fail to satisfy the local assistance request criteria.

Figure 4:
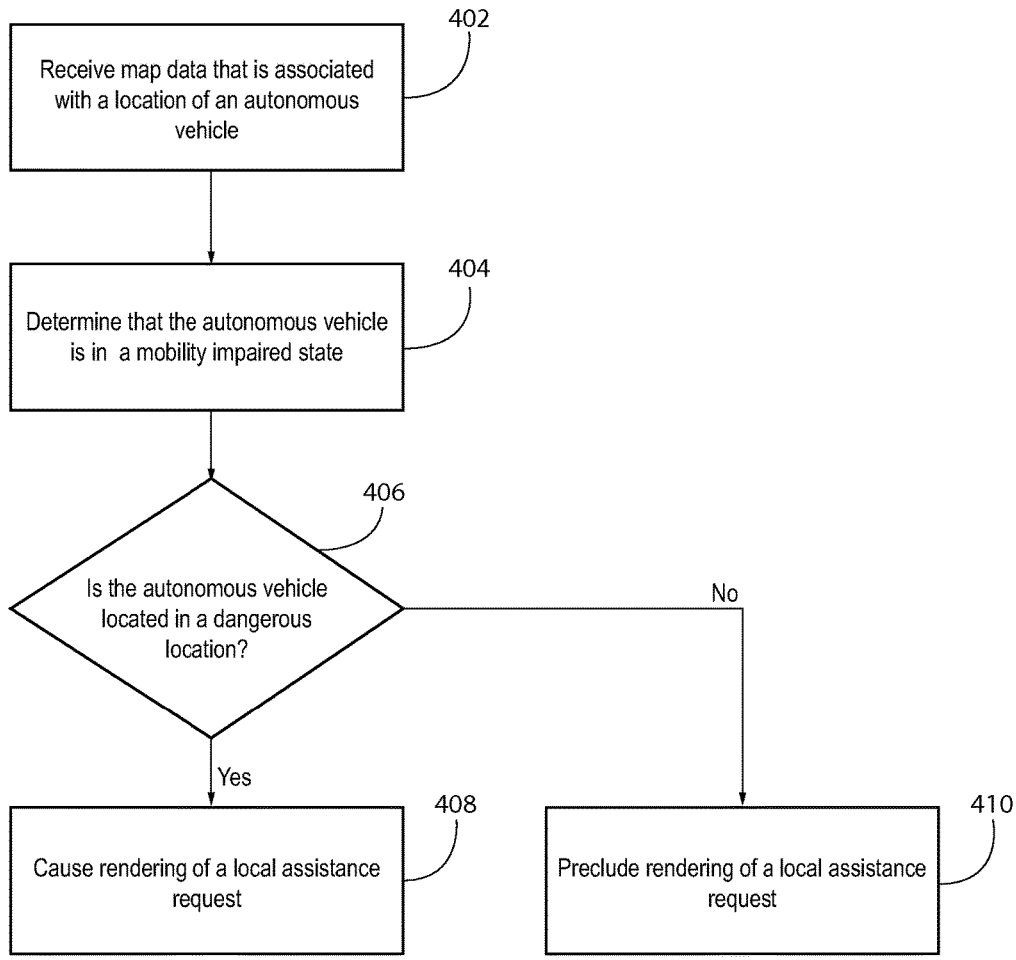
FIG. 4 is a flow diagram illustrating activities associated with determination whether an autonomous vehicle is located in a dangerous location according to at least one example embodiment.

FIG. 4 is a flow diagram illustrating activities associated with determination whether an autonomous vehicle is located in a dangerous location according to at least one example embodiment. In at least one example embodiment, there is a set of operations that corresponds with the activities of FIG. 4. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 4.

In some circumstances an autonomous vehicle may be located in a dangerous location. A dangerous location may refer to a location where it is undesirable for an autonomous vehicle to be immobile. For example, a location where it may be unsafe for the autonomous vehicle to be immobile, where there is a risk of loss or damage of the autonomous vehicle if it remains in the location, and/or the like may be referred to as a dangerous location. For example, a busy highway, an unstable embankment, a railroad track, the middle of an intersection, a location experiencing poor weather conditions (e.g. flooding, tornados, and/or the like), and/or the like may be dangerous locations.

In some circumstances, it may be desirable for an apparatus to determine that an autonomous vehicle is located in a dangerous location. For example, if an apparatus is in a mobility impaired state while located in a dangerous location, it may be desirable for the apparatus to cause rendering of a local assistance request. In at least one example embodiment, an apparatus determines that an autonomous vehicle is located in a dangerous location. A determination that an autonomous vehicle is located in a dangerous location may be based, at least in part, on the location of the autonomous vehicle, the operational state of the vehicle, and/or the like. For example, map data associated with the location of the autonomous vehicle may indicate that an immobile autonomous vehicle at a particular location is beyond a safety threshold. For example, a safety rating may be associated with the location in a geographic database, a formula may be applied to the map data (e.g. a certain amount of traffic makes the location dangerous, and map data may indicate a traffic level), a particular category of location (e.g. an intersection) may be categorized as a dangerous location, and/or the like. In another example, an apparatus may use self determination to identify that a location is dangerous. For example, sensors may detect heavy traffic, poor traction, a steep grade, and/or the like.

In some circumstances, map data may indicate that a location is persistently a dangerous location. For example, static map data for locations near a river may indicate that the river bank is a persistent dangerous location. For example, the riverbank may be unstable, may have a steep drop off, and/or the like. In another example, static map data may indicate that portions of a road with no shoulder, an overpass, railroad tracks, and/or the like are dangerous locations. For example, traffic may have difficulty navigating around a disabled autonomous vehicle in such locations without interfering with, veering into, etc., oncoming traffic.

In some circumstances, map data may indicate certain transient conditions that may cause a location to be considered as dangerous. For example, dynamic map data for a road may indicate that the road is dangerous during commuting hours, but fails to be dangerous in early morning hours. In another example, dynamic map data may indicate that a low water crossing is safe during dry periods, but is dangerous during periods of rain.

At block 402, the apparatus receives map data that is associated with a location of an autonomous vehicle, similarly as described regarding block 302 of FIG. 3. At block 404, the apparatus determines that the autonomous vehicle is in a mobility impaired state. In at least one example embodiment, the determination that the autonomous vehicle is in a mobility impaired state is based, at least in part, on the location of the autonomous vehicle. The determination and the mobility impaired state may be similar as described regarding FIG. 2 and FIG. 3.

At block 406, the apparatus determines whether the autonomous vehicle is located in a dangerous location. In at least one example embodiment, the determination whether the autonomous vehicle is located in a dangerous location is based, at least in part, on the determination that the autonomous vehicle is in the mobility impaired state. If the apparatus determines that the vehicle is located in a dangerous location, flow proceeds to block 408. If the apparatus determines that the vehicle fails to be located in a dangerous location, flow proceeds to block 410. The determination and the dangerous location may be similar as described regarding FIG. 2.

At block 408, the apparatus causes rendering of a local assistance request, similarly as described regarding block 308 of FIG. 3. In at least one example embodiment, the causation of rendering of the local assistance request based, at least in part, on the determination that the autonomous vehicle is in a mobility impaired state and the determination that the vehicle is located in a dangerous location.

At block 410, the apparatus precludes rendering of a of a local assistance request, similarly as described regarding block 310 of FIG. 3. In at least one example embodiment, the preclusion of rendering of the local assistance request is based, at least in part, on the determination that the vehicle fails to be located in a dangerous location.

Figure 5:
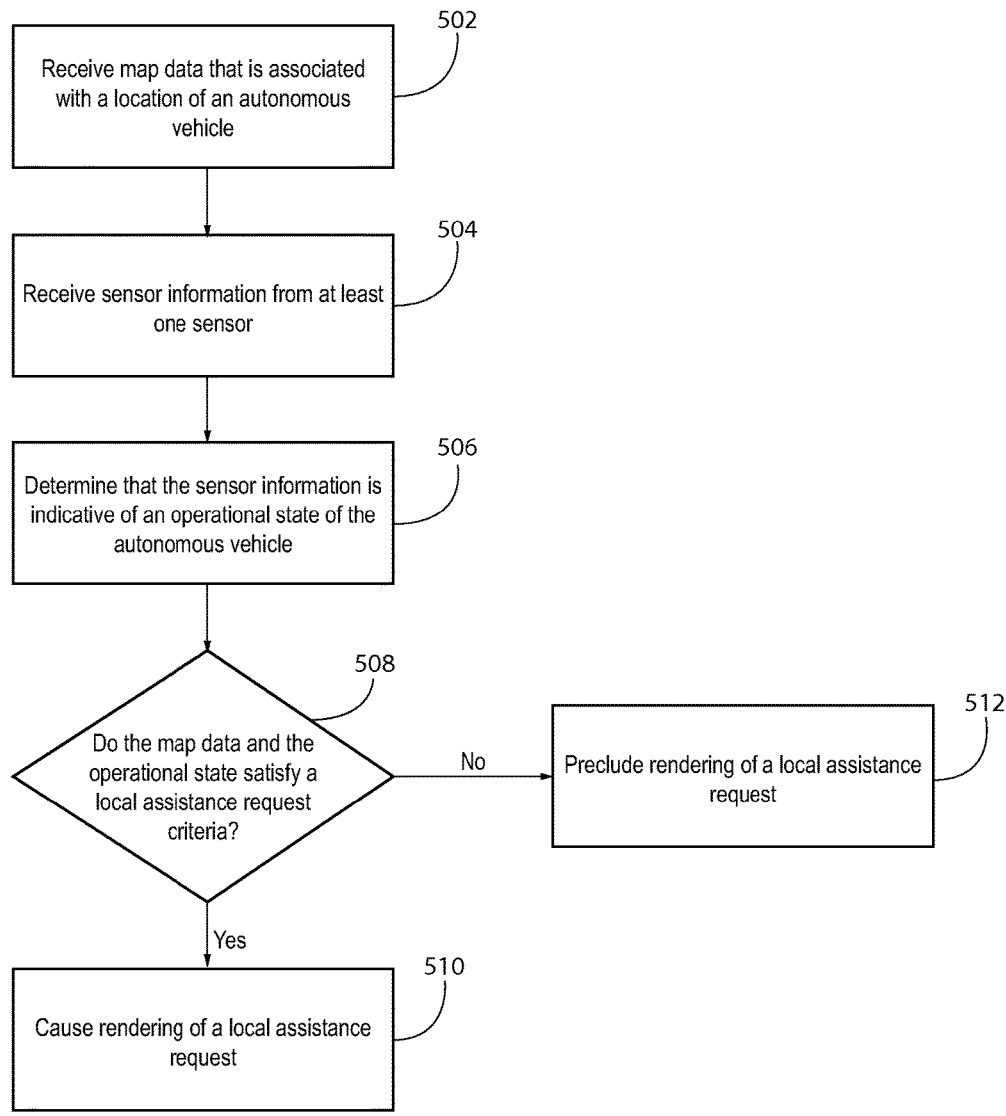
FIG. 5 is a flow diagram illustrating activities associated with receipt of sensor information according to at least one example embodiment.

FIG. 5 is a flow diagram illustrating activities associated with receipt of sensor information according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 5.

As previously described, in some circumstances an apparatus may receive sensor information from a sensor. In circumstances such as these, the sensor information may be indicative of an operational state. In at least one example embodiment, determination of an operational state comprises receiving sensor information from at least one sensor, and determining that the sensor information is indicative of the operational state. For example, a speed sensor may indicate that an autonomous vehicle is moving at a desired speed.

At block 502, the apparatus receives map data that is associated with a location of an autonomous vehicle, similarly as described regarding block 302 of FIG. 3. At block 504, the apparatus receives sensor information from at least one sensor. The receipt, the sensor information, and the sensor may be similar as described regarding FIG. 1 and FIG. 2.

At block 506, the apparatus determines that the map data and the sensor information is indicative of an operational state of the autonomous vehicle. The indication and the operational state may be similar as described regarding FIG. 1, FIG. 2, FIG. 3, and FIG. 4.

At block 508, the apparatus determines whether the map data and the operational state satisfy a local assistance request criteria, similarly as described regarding block 306 of FIG. 3. If the apparatus determines that the map data and the operational state satisfy a local assistance request criteria, flow proceeds to block 510. If the apparatus determines that the map data and the operational state fail to satisfy a local assistance request criteria, flow proceeds to block 512.

At block 510, the apparatus causes rendering of a local assistance request, similarly as described regarding block 308 of FIG. 3 At block 512, the apparatus precludes rendering of a of a local assistance request, similarly as described regarding block 310 of FIG. 3

Figure 6:
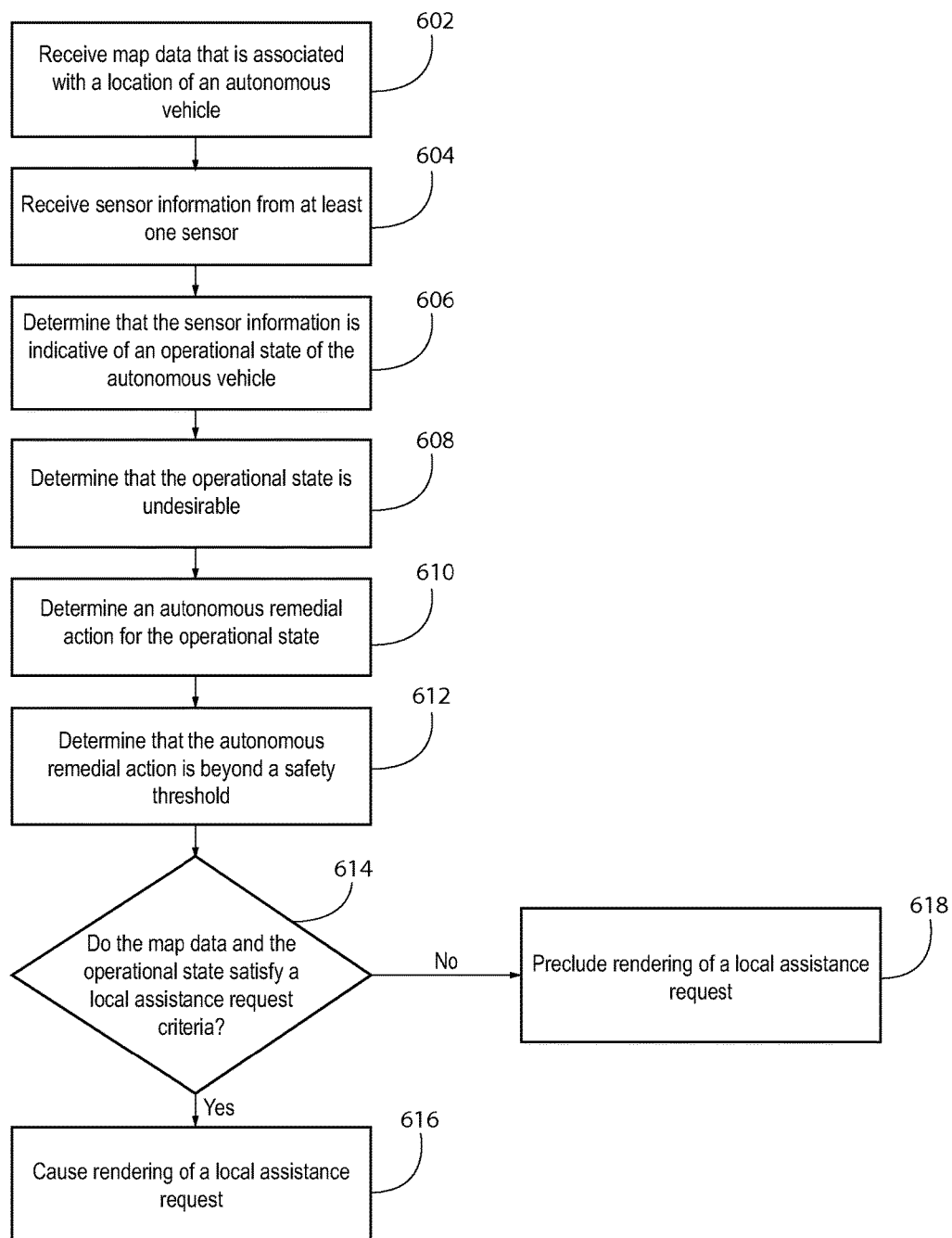
FIG. 6 is a flow diagram illustrating activities associated with determination that an autonomous remedial action is beyond a safety threshold according to at least one example embodiment.

FIG. 6 is a flow diagram illustrating activities associated with determination that an autonomous remedial action is beyond a safety threshold according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 6.

As previously described, in some circumstances, an operational state of an autonomous vehicle may be undesirable. In circumstances such as these, it may be desirable to determine an autonomous remedial action for the operational state. For example, if the path of an autonomous vehicle is obstructed such that the autonomous vehicle is in a mobility impaired state, it may be desirable for the autonomous vehicle to determine a navigational path around the obstruction. In this manner, the autonomous vehicle may remedy the undesirable operational state. In some circumstances, an autonomous remedial action may be beyond a safety threshold. For example, dynamic map data, static map data, and/or the like may indicate that an autonomous remedial action may involve the autonomous vehicle performing a traffic law violation, enter oncoming traffic, crossing an unstable surface, colliding with property, operating the autonomous vehicle beyond design specifications (e.g. over stress the motor), and/or the like. In circumstances such as these, it may be desirable to determine that the autonomous remedial action is beyond a safety threshold. In this manner, an apparatus may preclude performance of the remedial action, cause rendering of a local assistance request, and/or the like in circumstances where the remedial action is beyond the safety threshold.

At block 602, the apparatus receives map data that is associated with a location of an autonomous vehicle, similarly as described regarding block 302 of FIG. 3. At block 604, the apparatus receives sensor information from at least one sensor, similar as described regarding block 504 of FIG. 5. At block 606, the apparatus determines that the sensor information is indicative of an operational state of the autonomous vehicle, similar as described regarding block 506 of FIG. 5.

At block 608, the apparatus determines that the operational state is undesirable. In at least one example embodiment, the determination that the operational state is undesirable is based, at least in part, on the sensor information and the location of the autonomous vehicle.

At block 610, the apparatus determines an autonomous remedial action for the operational state. In at least one example embodiment, the determination of the autonomous remedial action for the operation state is based, at least in part, on the determination that the operational state is undesirable.

At block 612, the apparatus determines that the autonomous remedial action is beyond a safety threshold. In at least one example embodiment, the determination that the autonomous remedial action is beyond a safety threshold is based, at least in part, on the map data.

At block 614, the apparatus determines whether the map data and the operational state satisfy a local assistance request criteria, similarly as described regarding block 306 of FIG. 3. If the apparatus determines that the map data and the operational state satisfy a local assistance request criteria, flow proceeds to block 510. If the apparatus determines that the map data and the operational state fail to satisfy a local assistance request criteria, flow proceeds to block 512.

At block 616, the apparatus causes rendering of a local assistance request, similarly as described regarding block 308 of FIG. 3 At block 618, the apparatus precludes rendering of a of a local assistance request, similarly as described regarding block 310 of FIG. 3.

Figure 7:
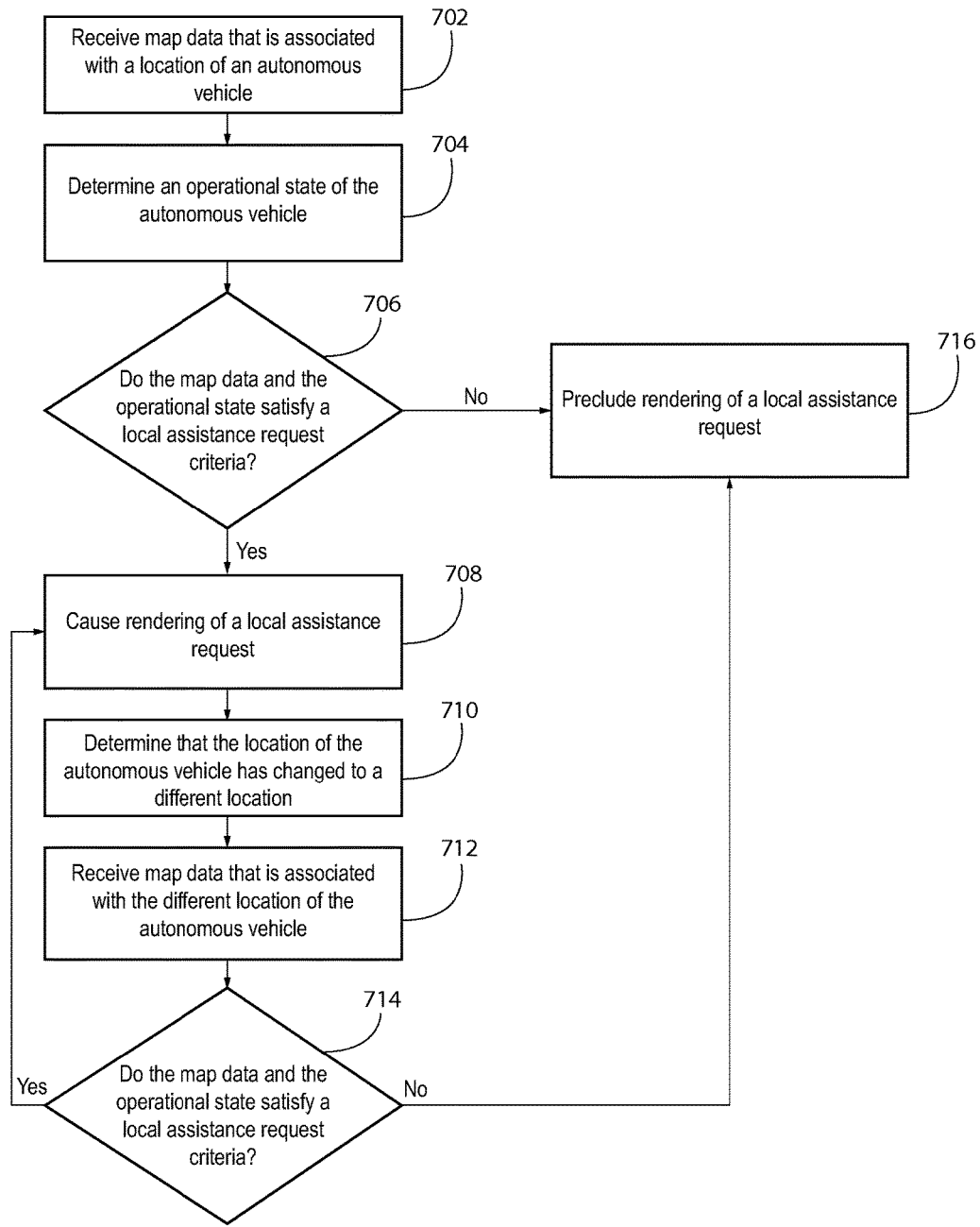
FIG. 7 is a flow diagram illustrating activities associated with determination that the location of an autonomous vehicle has changed to a different location according to at least one example embodiment.

FIG. 7 is a flow diagram illustrating activities associated with determination that the location of an autonomous vehicle has changed to a different location according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 7.

In some circumstances, an autonomous vehicle may change locations. For example, a vehicle operating in a mobility impaired state may receive assistance from a responder and be towed, pushed, and/or the like to a different location. In circumstances such as these, it may be desirable to preclude rendering of a local assistance request, terminate rendering of a local assistance request (in circumstances where a local assistance request has been rendered), and/or the like. For example, the autonomous vehicle may have been moved from a dangerous location to a non-dangerous location.

At block 702, the apparatus the apparatus receives map data that is associated with a location of an autonomous vehicle, similarly as described regarding block 302 of FIG. 3. At block 704, the apparatus determines an operational state of the autonomous vehicle, similarly as described regarding block 304 of FIG. 3. At block 706, the apparatus determines whether the map data and the operational state satisfy a local assistance request criteria, similarly as described regarding block 306 of FIG. 3. If the apparatus determines that the map data and the operational state satisfy a local assistance request criteria, flow proceeds to block 708. If the apparatus determines that the map data and the operational state fail to satisfy a local assistance request criteria, flow proceeds to block 716. At block 708, the apparatus causes rendering of a local assistance request, similarly as described regarding block 308 of FIG. 3

At block 710, the apparatus determines that the location of the autonomous vehicle has changed to a different location. The determination and the location may be similar as described regarding FIG. 2, FIG. 3, FIG. 4, FIG. 5, and FIG. 6.

At block 712, the apparatus receives map data that is associated with the different location of the autonomous vehicle. The receipt, the map data, and the association may be similar as described regarding FIG. 1, FIG. 2, FIG. 3, FIG. 4, FIG. 5, and FIG. 6.

At block 714, the apparatus determines whether the map data and the operational state satisfy a local assistance request criteria, similarly as described regarding block 706. If the apparatus determines that the map data and the operational state satisfy a local assistance request criteria, flow proceeds to block 708. If the apparatus determines that the map data and the operational state fail to satisfy a local assistance request criteria, flow proceeds to block 716. At block 716, the apparatus precludes rendering of a of a local assistance request, similarly as described regarding block 310 of FIG. 3.

Figure 8:
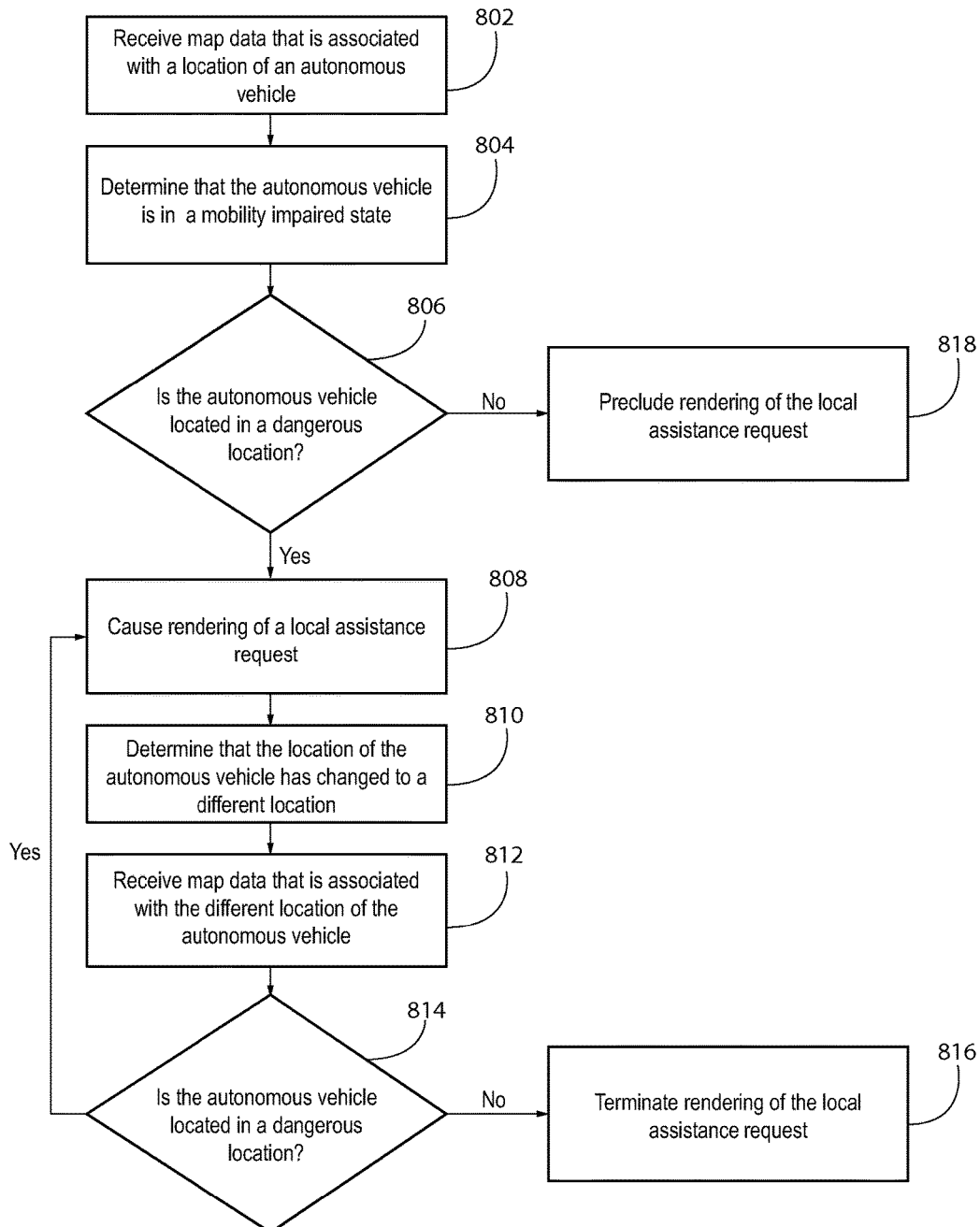
FIG. 8 is a flow diagram illustrating activities associated with termination of rendering of a local assistance request according to at least one example embodiment.

FIG. 8 is a flow diagram illustrating activities associated with termination of rendering of a local assistance request according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 8.

As previously described, in some circumstances it may be desirable to terminate rendering of a local assistance request, preclude rendering of a local assistance request, and/or the like.

At block 802, the apparatus receives map data that is associated with a location of an autonomous vehicle, similarly as described regarding block 302 of FIG. 3. At block 804, the apparatus determines that the autonomous vehicle is in a mobility impaired state, similarly as described regarding block 404 of FIG. 4.

At block 806, the apparatus determines whether the autonomous vehicle is located in a dangerous location, similarly as described regarding block 406 of FIG. 4. If the apparatus determines that the vehicle is located in a dangerous location, flow proceeds to block 808. If the apparatus determines that the vehicle fails to be located in a dangerous location, flow proceeds to block 818.

At block 808, the apparatus the apparatus causes rendering of a local assistance request, similarly as described regarding block 308 of FIG. 3. At block 810, the apparatus determines that the location of the autonomous vehicle has changed to a different location, similarly as described regarding block 710 of FIG. 7. At block 812, the apparatus receives map data that is associated with the different location of the autonomous vehicle, similarly as described regarding block 712 of FIG. 7.

At block 814, the apparatus determines whether the autonomous vehicle is located in a dangerous location, similarly as described regarding block 806. If the apparatus determines that the vehicle is located in a dangerous location, flow proceeds to block 814. If the apparatus determines that the vehicle fails to be located in a dangerous location, flow proceeds to block 818.

At block 816, the apparatus terminates rendering of the local assistance request. In at least one example embodiment, the termination of rendering of the local assistance request is based, at least in part, on the determination that the autonomous vehicle fails to be located in the dangerous location and the determination that the autonomous vehicle is in the mobility impaired state. At block 818, the apparatus precludes rendering of a of a local assistance request, similarly as described regarding block 310 of FIG. 3.

Figure 9:
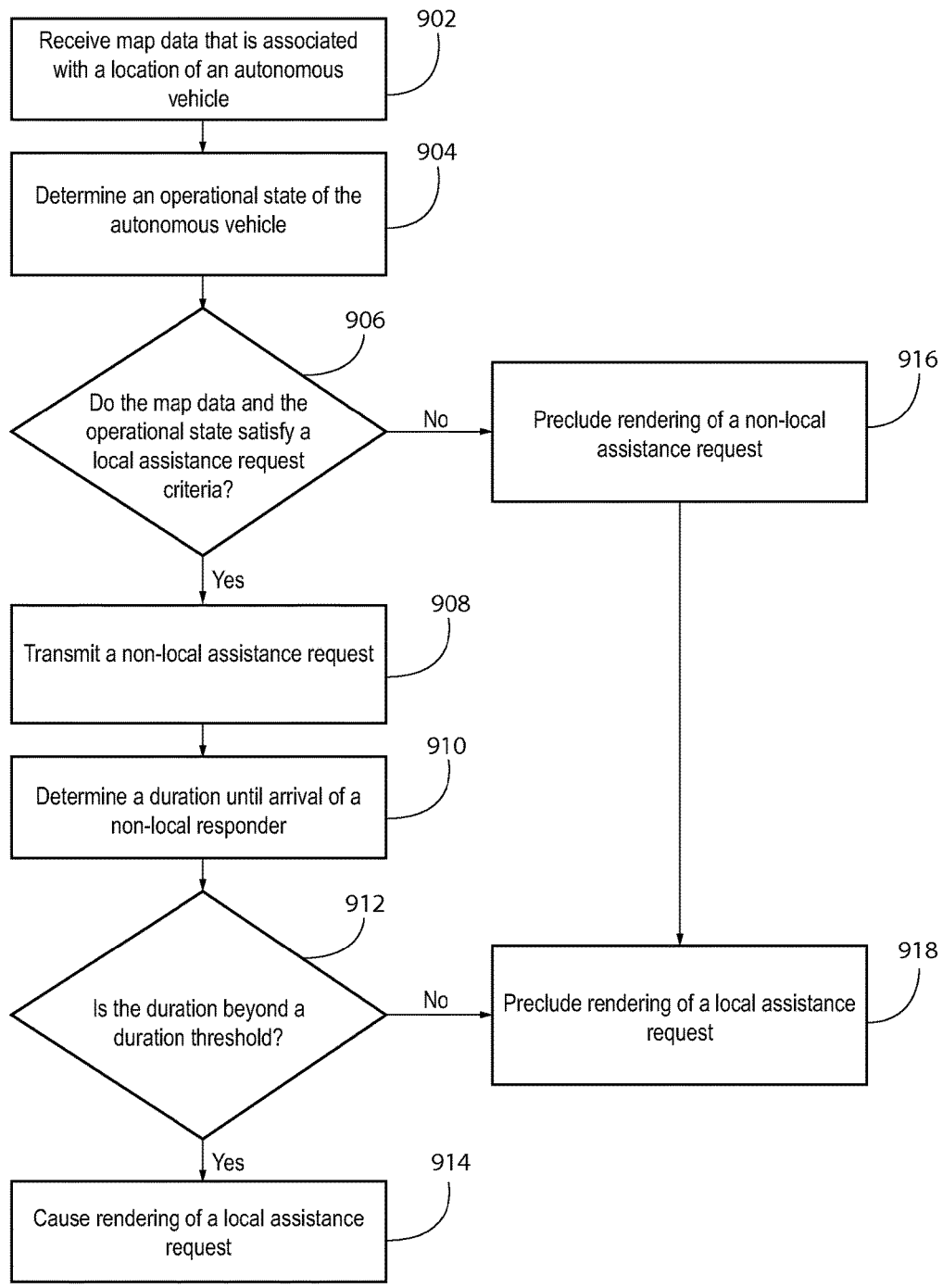
FIG. 9 is a flow diagram illustrating activities associated with transmission of a non-local assistance request according to at least one example embodiment.

FIG. 9 is a flow diagram illustrating activities associated with transmission of a non-local assistance request according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 9.

As previously described, an apparatus may determine an operational state of an autonomous vehicle. In some circumstances, it may be desirable to transmit a non-local assistance request based, at least in part, on the operational state. For example, if the operational state is a mobility impaired state, it may be beneficial for the autonomous vehicle to receive assistance from a responder. In some circumstances, a non-local responder may be preferred over a local responder. For instance, a non-local responder may have a particular skill set, insurance, may be employed by the autonomous vehicle operator, and/or the like. For example, if the autonomous vehicle has a mechanical breakdown, a tire failure, and/or the like, a non-local responder to the local assistance request may provide repairs to the autonomous vehicle. For instance, an automotive technical may repair a mechanical component, replace a tire, and/or the like on the autonomous vehicle. An operator of the autonomous vehicle may prefer that a local responder that is a layperson not perform such operations. In circumstances such as these, it may be desirable to transmit a non-local assistance request based, at least in part, on the operational state.

A non-local assistance request may refer to a non-distance-limited signal that solicits assistance with movement of the autonomous vehicle. For example, a local assistance request may be a communication on an indirect communication channel similar as described regarding FIG. 2. For instance, the non-distance-limited signal may comprises a non-visual signal, a non-audible signal, a non-low-power radio frequency signal, and/or the like. For example, the apparatus transmit a radio frequency signal over an indirect communication channel similar as described regarding FIG. 2. In this manner, the local assistance request may be received by potential responders. For example, another autonomous vehicle, an emergency services dispatch center, an autonomous vehicle control center, and/or the like may perceive the non-local assistance request by way of the indirect communication channel. In at least one example embodiment, an apparatus transmits a non-local assistance request. A non-local assistance request may refer to a solicitation for assistance by a non-local responder.

In some circumstances, a non-local responder may not be able to reach an autonomous vehicle in a timely fashion. For example, the non-local responder may be far away, may be responding to another event, may be currently unavailable, and/or the like. In some circumstances, a delay from a non-local responder may be undesirable. For example, if the autonomous vehicle is located in a dangerous location, it may be desirable for the autonomous vehicle to receive assistance sooner than a non-local responder can assist. In circumstances such as these, it may be desirable for an apparatus to determine a duration until arrival of a non-local responder. For example, the non-local responder may communicate the duration to the apparatus, the apparatus may compute the duration based on the location of the non-local responder, the duration may be estimated based on an average response time, and/or the like. In this manner, if the duration is beyond a duration threshold, the apparatus may cause rendering of a local assistance request, similar as previously described. For example, if an autonomous vehicle stalls along a riverbank of a rising river, the river may breach the bank before a non-local responder may arrive and result in the flooding the autonomous vehicle. In these circumstances, a duration threshold may be a time before which the river will breach the bank. For example, if the river will breach the bank within 45 minutes, a duration threshold may be 30 minutes to provide time for a responder to assist the autonomous vehicle when it arrives. In circumstances where a non-local responder cannot respond within 30 minutes, the apparatus may cause rendering of a local assistance request. In this manner, a local responder may provide assistance.

At block 902, the apparatus receives map data that is associated with a location of an autonomous vehicle, similarly as described regarding block 302 of FIG. 3. At block 904, the apparatus determines an operational state of the autonomous vehicle, similarly as described regarding block 304 of FIG. 3.

At block 906, the apparatus determines whether the map data and the operational state satisfy a local assistance request criteria, similarly as described regarding block 306 of FIG. 3. If the apparatus determines that the map data and the operational state satisfy a local assistance request criteria, flow proceeds to block 908. If the apparatus determines that the map data and the operational state fail to satisfy a local assistance request criteria, flow proceeds to block 916.

At block 908, the apparatus transmits a non-local assistance request. In at least one example embodiment, the transmission of the non-local assistance request is based, at least in part, on a determination that the map data and the operational state satisfy the local assistance request criteria, the non-local assistance request being solicitation for assistance by a non-local responder.

At block 910, the apparatus determines a duration until arrival of a non-local responder. At block 912, the apparatus determines whether the duration is beyond a duration threshold. If the apparatus determines that the duration is beyond a duration threshold, flow proceeds to block 914. If the apparatus determines that the duration is within a duration threshold, flow proceeds to block 918.

At block 914, the apparatus causes rendering of a local assistance request, similar as described regarding block 308 of FIG. 3. In at least one example embodiment, the causation of rendering of the local assistance request is based, at least in part, on a determination that the duration is beyond a duration threshold.

At block 916, the apparatus precludes rendering of a of a non-local assistance request. In at least one example embodiment, preclusion of rendering of a of a non-local assistance request is based, at least in part, on a determination that the map data and the operational state fail to satisfy the local assistance request criteria, the non-local assistance request being solicitation for assistance by a non-local responder.

At block 918, the apparatus precludes rendering of a of a local assistance request, similarly as described regarding block 310 of FIG. 3. In at least one example embodiment, the preclusion of rendering of the local assistance request is based, at least in part, on a determination that the duration is within a duration threshold. In at least one example embodiment, preclusion of rendering of a of a local assistance request is based, at least in part, on a determination that the map data and the operational state fail to satisfy the local assistance request criteria, the non-local assistance request being solicitation for assistance by a non-local responder.

In some circumstances, a duration until arrival may change. For example, a non-local responder may become available that was previously unavailable, traffic conditions may clear, and/or the like. In circumstances such as these, it may be desirable to determine that the duration until arrive has changed. For example, if a local assistance request is being rendered, it may be desirable to terminate the local assistance request in circumstances where the non-local responder may now arrive within the duration threshold. In at least one example embodiment, an apparatus determines a duration until arrival has changed to a different duration. For example, a non-local responder may communicate the change to the apparatus, the apparatus may compute the new duration until arrival, and/or the like. In at least one example embodiment, an apparatus determines that the different duration is within the duration threshold and causes termination of a local assistance request based, at least in part, on the determination that the different duration is within the duration threshold.

Figure 10:
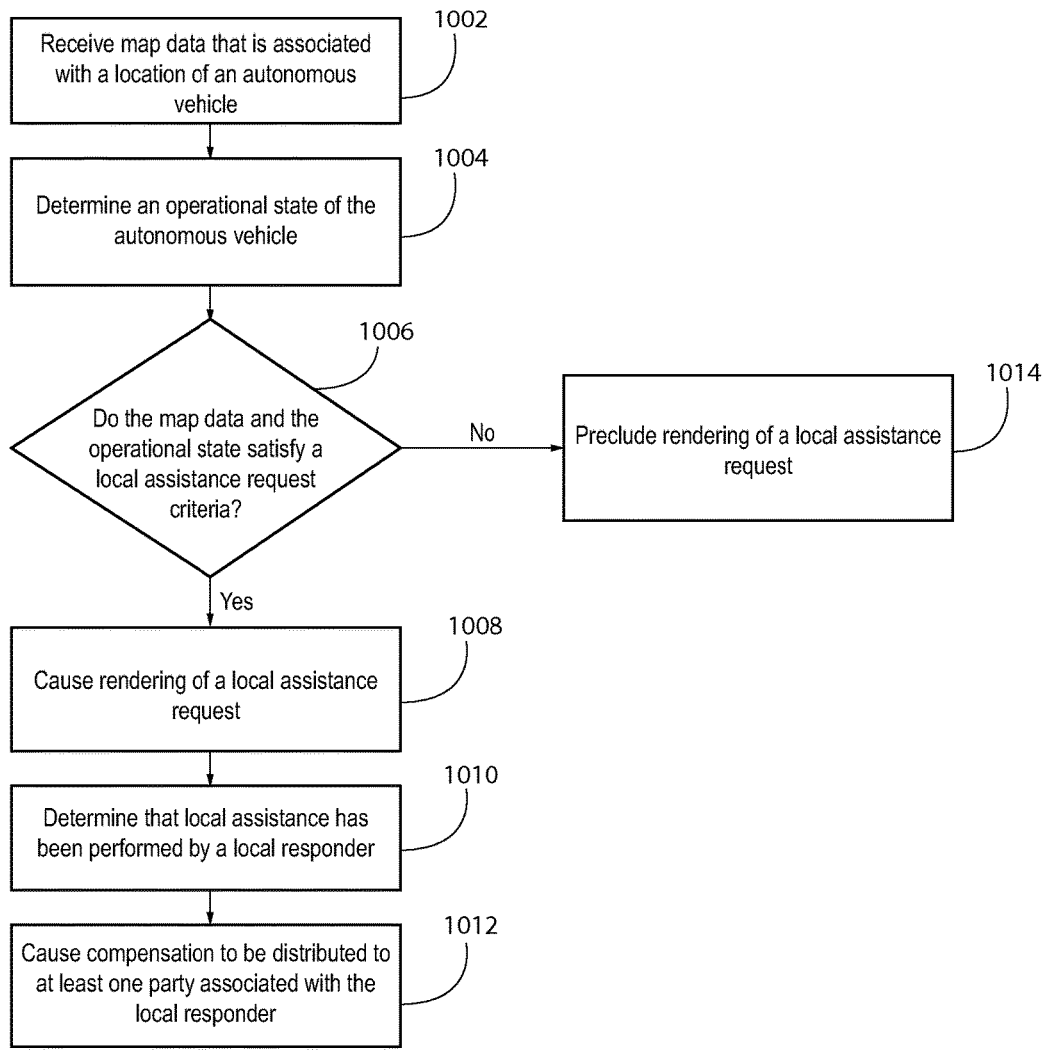
FIG. 10 is a flow diagram illustrating activities associated with distribution of compensation to a responder according to at least one example embodiment.

FIG. 10 is a flow diagram illustrating activities associated with distribution of compensation to a responder according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 10.

In some circumstances, it may be desirable to compensate a local responder to a local assistance request. For example, compensation may encourage a local responder to render assistance, an operator of the autonomous vehicle may desire to show an expression of gratitude to the local responder, the local responder may only offer assistance for a fee, and/or the like. In circumstances such as these, it may be desirable to determine that local assistance has been performed by the local responder. In this manner, compensation may be distributed to at least one party associated with the local responder. For example, if the local responder is a different autonomous vehicle, an operator of the different autonomous vehicle may be provided monetary compensation. In another example, if the local responder is a pedestrian, the pedestrian may be provided compensation directly from the autonomous vehicle. Compensation may be non-monetary. For example, compensation could be a discount coupon, a communication of gratitude (e.g. a thank you message), and/or the like.

At block 1002, the apparatus the apparatus receives map data that is associated with a location of an autonomous vehicle, similarly as described regarding block 302 of FIG. 3. At block 1004, the apparatus determines an operational state of the autonomous vehicle, similarly as described regarding block 304 of FIG. 3. At block 1006, the apparatus determines whether the map data and the operational state satisfy a local assistance request criteria, similarly as described regarding block 306 of FIG. 3. If the apparatus determines that the map data and the operational state satisfy a local assistance request criteria, flow proceeds to block 1008. If the apparatus determines that the map data and the operational state fail to satisfy a local assistance request criteria, flow proceeds to block 1014. At block 1008, the apparatus causes rendering of a local assistance request, similarly as described regarding block 308 of FIG. 3.

At block 1010, the apparatus determines that local assistance has been performed by a local responder. At block 1012, the apparatus causes compensation to be distributed to at least one party associated with the local responder. In at least one example embodiment, the causation of compensation to be distributed is based, at least in part, on the determination that local assistance has been performed by a local responder. At block 1014, the apparatus precludes rendering of a of a local assistance request, similarly as described regarding block 310 of FIG. 3.

One or more example embodiments may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 602 of FIG. 6 may be performed after block 604 of FIG. 6. Furthermore, if desired, one or more of the above-described functions may be optional or may be combined. For example, block 602 of FIG. 6 may be optional and/or combined with block 604 of FIG. 6.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
   at least one processor;
   at least one memory including computer program code, the memory and the computer program code configured to, working with the processor, cause the apparatus to at least:
   receive map data that is associated with a location of an autonomous vehicle;
   determine an operational state of the autonomous vehicle;
   determine whether to request local assistance based on whether the map data and the operational state satisfy one or more local assistance request criteria; and
   generate a local assistance request based, at least in part, on the determination that the map data and the operational state satisfy the one or more local assistance request criteria.

2. The apparatus of claim 1, wherein the memory includes computer program code configured to, working with the processor, cause the apparatus to transmit a non-local assistance request based, at least in part, on the determination that the map data and the operational state satisfy the one or more local assistance request criteria, the non-local assistance request being solicitation for assistance by a non-local responder.

3. The apparatus of claim 2, wherein the memory includes computer program code configured to, working with the processor, cause the apparatus to:
   determine a duration until arrival of the non-local responder; and
   determine that the duration is beyond a duration threshold, wherein the generating the local assistance request is based, at least in part, on the determination that the duration is beyond the duration threshold.

4. The apparatus of claim 1, wherein the memory includes computer program code configured to, working with the processor, cause the apparatus to:
   determine that local assistance has been performed by a local responder; and
   cause compensation to be distributed to at least one party associated with the local responder.

5. The apparatus of claim 1, wherein the operational state is a mobility impaired state, and the determination that the map data and the operational state satisfy the one or more local assistance request criteria comprises determination based, at least in part, on the map data and the determination that the autonomous vehicle is in the mobility impaired state, that the autonomous vehicle is located in a dangerous location, wherein the determination that the map data and the operational state satisfy the one or more local assistance request criteria is based, at least in part, on the determination that the autonomous vehicle is located in the dangerous location.

6. The apparatus of claim 1, wherein determination of the operational state comprises:
receipt of sensor information from at least one sensor; and
determination that the sensor information is indicative of the operational state.

7. The apparatus of claim 6, wherein the determination that the sensor information is indicative of the operational state comprises:
determination that the operational state is undesirable;
determination of an autonomous remedial action for the operational state; and
determination based, at least in part, on the map data, that the autonomous remedial action is beyond a safety threshold.

8. The apparatus of claim 1, wherein the apparatus comprises the autonomous vehicle.

9. A method comprising:
receiving map data that is associated with a location of an autonomous vehicle;
receiving sensor information from at least one sensor of the autonomous vehicle;
determining an operational state of the autonomous vehicle based on the sensor information;
determining that the map data and the operational state satisfy one or more local assistance request criteria; and
rendering of a local assistance request based, at least in part, on the determination that the map data and the operational state satisfy the one or more local assistance request criteria.

10. The method of claim 9, further comprising transmitting a non-local assistance request based, at least in part, on the determination that the map data and the operational state satisfy the one or more local assistance request criteria, the non-local assistance request being solicitation for assistance by a non-local responder.

11. The method of claim 10, further comprising:
determining a duration until arrival of the non-local responder; and
determining that the duration is beyond a duration threshold, wherein the rendering of the local assistance request is based, at least in part, on the determination that the duration is beyond the duration threshold.

12. The method of claim 9, further comprising:
determining that local assistance has been performed by a local responder; and
causing compensation to be distributed to at least one party associated with the local responder.

13. The method of claim 9, wherein the operational state is a mobility impaired state, and the determination that the map data and the operational state satisfy the one or more local assistance request criteria comprises determination based, at least in part, on the map data and the determination that the autonomous vehicle is in the mobility impaired state, that the autonomous vehicle is located in a dangerous location, wherein the determination that the map data and the operational state satisfy the one or more local assistance request criteria is based, at least in part, on the determination that the autonomous vehicle is located in the dangerous location.

14. The method of claim 9, wherein the determination that the operational state of the autonomous vehicle is based on the sensor information comprises:
determining that the operational state is undesirable;
determining of an autonomous remedial action for the operational state; and
determining based, at least in part, on the map data, that the autonomous remedial action is beyond a safety threshold.

15. At least one non-transitory computer-readable medium encoded with instructions that, when executed by a processor:
receive map data that is associated with a location of an autonomous vehicle;
determine an operational state of the autonomous vehicle;
determine that the map data and the operational state satisfy one or more local assistance request criteria;
cause rendering of a local assistance request based, at least in part, on the determination that the map data and the operational state satisfy the one or more local assistance request criteria;
determine that local assistance has been performed by a local responder; and
cause compensation to be distributed to at least one party associated with the local responder.

16. The medium of claim 15, further encoded with instructions that, when executed by a processor transmit a non-local assistance request based, at least in part, on the determination that the map data and the operational state satisfy the one or more local assistance request criteria, the non-local assistance request being solicitation for assistance by a non-local responder.

17. The medium of claim 16, further encoded with instructions that, when executed by a processor:
determine a duration until arrival of the non-local responder; and
determine that the duration is beyond a duration threshold, wherein the causation of rendering of the local assistance request is based, at least in part, on the determination that the duration is beyond the duration threshold.

18. An apparatus, comprising:
at least one processor;
at least one memory including computer program code, the memory and the computer program code configured to, working with the processor, cause the apparatus to at least:
receive map data that is associated with a location of an autonomous vehicle;
receive sensor information from at least one sensor indicative of at least one aspect of an operation of the autonomous vehicle;
determine an operational state of the autonomous vehicle based on the sensor information;
determine that the operational state is undesirable;
determine an autonomous remedial action for the operational state;
determine that the autonomous remedial action is beyond a safety threshold based, at least in part, on the map data;
determine that the map data and the operational state satisfy one or more local assistance request criteria; and
generate a local assistance request based, at least in part, on the determination that the map data and the operational state satisfy the one or more local assistance request criteria.

19. The apparatus of claim 1, wherein the map data comprises at least one of road segment data, point of interest data, node data, perspective image data, video content data, cartographic data, routing data, maneuver data, traffic information, or weather information.

20. The method of claim 9, wherein the map data comprises at least one of road segment data, point of interest data, node data, perspective image data, video content data, cartographic data, routing data, maneuver data, traffic information, or weather information.

21. The medium of claim 15, wherein the map data comprises at least one of road segment data, point of interest data, node data, perspective image data, video content data, cartographic data, routing data, maneuver data, traffic information, or weather information.

22. The apparatus of claim 18, wherein the map data comprises at least one of road segment data, point of interest data, node data, perspective image data, video content data, cartographic data, routing data, maneuver data, traffic information, or weather information.

* * * * *